Oct. 28, 1958   G. H. APPEL   2,857,791
MANDREL
Filed July 21, 1955
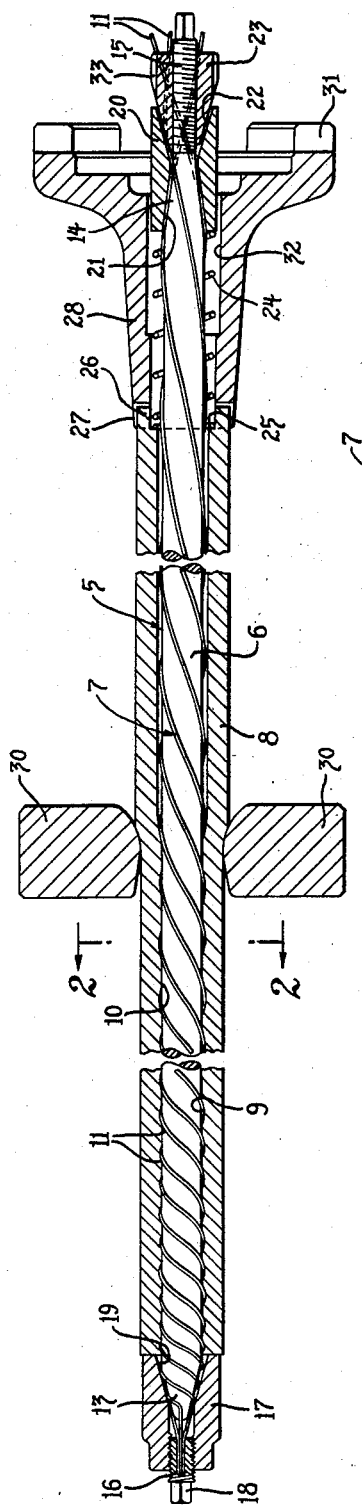
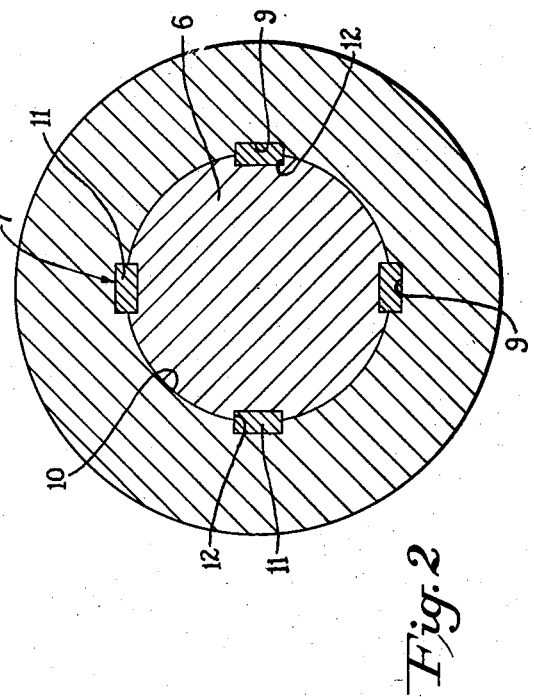
INVENTOR.
GERHARD H. APPEL
BY
ATTORNEY.

United States Patent Office 2,857,791
Patented Oct. 28, 1958

2,857,791

MANDREL

Gerhard H. Appel, Toronto, Ontario, Canada

Application July 21, 1955, Serial No. 523,598

4 Claims. (Cl. 78—103)

The invention relates to improvements in work shaping mandrels and more particularly to mandrels for determining the internal shape and dimensions of hollow or tubular workpieces formed by swaging and cold forging processes.

In carrying out processes of the above general character, the mandrel is inserted within a tubular work blank and the metal of the blank is forced inwardly by swaging or cold forging so that its internal surface conforms precisely to the external shape and dimensions of the mandrel. By suitably shaping the mandrel, as for example, by forming it with continuous, longitudinal ribs or ridges, workpieces with internal grooves, lands or teeth may be produced rapidly and economically. However, since the mandrel must be withdrawn axially from the finished workpiece, the use of such processes has been restricted heretofore to the production of workpieces in which the grooves are either straight, as in internally splined couplings or internally toothed gears, or in which the grooves are helical and of a uniform pitch or lead, as in the case of rifled gun barrels.

The primary object of the present invention is to remove the above restriction and thus enable the swaging or cold forging processes to be used in the production of tubular workpieces with internal shapes other than those above mentioned and particularly workpieces with indented or irregular internal surfaces or other internal shapes or dimensions that would preclude withdrawal of a conventional mandrel.

Another object is to provide an improved mandrel with which tubular workpieces can be swaged or cold forged with internal helical grooves having a non-uniform lead.

A more specific object is to provide an improved mandrel for forming tubular workpieces with internal helical grooves of progressively changing lead.

Other objects and advantages of the invention will become apparent from the following detailed description of the preferred embodiment illustrated in the accompanying drawings, in which Figure 1 is a longitudinal sectional view through a mandrel embodying the features of the invention, the mandrel being shown within a workpiece in process of being swaged or cold forged.

Fig. 2 is a transverse sectional view taken in a plane substantially on the line 2—2 of Fig. 1 through the mandrel and a portion of the workpiece that has been subjected to a swaging or cold forging operation.

By way of illustration, I have shown in Figure 1 of the drawings a mandrel 5 suitable for use with rotary swaging or forging machines, one type of which is disclosed in my co-pending application, Serial No. 450,500, filed August 17, 1954. In its overall aspects, the mandrel presents an external shape conforming precisely to the internal shape of a finished workpiece. To that end, it comprises an elongated solid body 6 of steel or other suitable metal having a cross-sectional shape similar to the basic configuration of the bore of the finished work.

To form the internal grooves or other indentations in the workpiece, the mandrel body is fitted with one or more profile elements 7 appropriately shaped to produce the desired workpiece shape. In the mandrel shown in Figure 1, the profile elements 7 comprise a series of upstanding, continuous, longitudinal ribs or ridges. With this particular mandrel, a tubular work blank 8 of slightly larger internal cross-sectional dimensions than the overall mandrel cross-sectional dimensions may be swaged or cold forged to produce an accurately dimensioned tubular workpiece with grooves 9 in its inner wall. The spaces or lands 10 between the grooves conform to the shape and dimensions of the mandrel body. The particular groove pattern shown is one suitable for forming gun barrels with helical rifling grooves decreasing progressively in pitch or lead from the breach to the muzzle of the barrel. It will be appreciated, however, that the groove pattern can be varied as required with respect to the cross-sectional shape, the longitudinal configuration or the number or spacing of the grooves.

In carrying out the invention, I depart from the usual and accepted practice by constructing the mandrel 5 so that the profile elements are readily separable from the mandrel body 6. Thus, the mandrel shown in Figure 1 has profile elements or ribs 7 in the form of strips 11 of tough, yet relatively flexible material such as steel adapted to be drawn endwise out of the grooves of the workpiece while the mandrel body 6 remains in place. This makes it possible to produce internally grooved work with groove patterns not previously susceptible for formation by forging or swaging processes.

As the positions of the profile elements relative to each other, or to the mandrel body, must usually be determined precisely, the mandrel body may be formed with pilot grooves or the like for locating the elements. Alternatively, the elements may be positioned by a jig or fixture and attached to the mandrel body by cementing, brazing, soldering or other manner permitting them to be readily separated from the body.

In the exemplary mandrel shown in Figure 1, the profile strips 11 are located by seating them in longitudinal grooves 12 formed in the mandrel body. In this particular mandrel, the profile strips are generally rectangular in cross-section and the grooves 12 are complementally shaped to receive the strips. The grooves 12, of course, are relatively shallow and of uniform depth so that a predetermined portion of associated profile strip extends above the mandrel body surface for forming the internal grooves 9 in the work. The profile strip shown produces a relatively wide, shallow groove in the inner wall of the finished workpiece. It will be understood, of course, that profile strips of circular, triangular or other cross-sectional shape may be employed and that the strips may be of uniform cross-sectional area throughout their length or tapered, as desired.

The exemplary mandrel of Figure 1 is designed to produce four helical grooves 9 of progressively decreasing pitch or lead from right to left as viewed in Figure 1. The "twist" of the grooves has been somewhat exaggerated to better illustrate the problems involved. It will be evident that the mandrel may be constructed and arranged to produce a single groove or any reasonable number of grooves desired. Moreover, it may be constructed to produce straight or sinuous grooves or helical grooves with a pitch or lead that varies other than progressively.

Preferably the mandrel body 6 has its forward end tapered to present a conical nose 13. The other end of the body merges by way of a tapered section 14 into a tailpiece 15 of reduced diameter and screw threaded for a purpose that will appear presently. The grooves 12 are extended over the tapered portions 13 and 14 for cooperation with profile strip clamping means which serve to insure retention of the profile strips 11 in correct position on the mandrel body during a forging operation.

In the case of a mandrel of the type illustrated, the forward ends of the profile strips are gathered together and suitably anchored to an externally threaded plug element 16. This plug element has a diameter such that it can pass freely through the hollow work blank. With the profile strips anchored in place, the plug is placed over the nose 13 of the mandrel body and the assembly is then inserted in one end of the work blank. As the mandrel moves into the blank, the profile strips 11 are progressively laid in their respective grooves 12. The close fit with the walls of the work blank effectively retains the profile strips in the grooves during this assembly process.

As the plug 16 and nose portion of the mandrel body emerge from the other end of the blank, an internally threaded cap member 17 is screwed on to the plug until the latter projects as shown in Fig. 1. The end 18 of the plug may be squared or otherwise shaped for engagement with a wrench or similar tool to hold it against rotation while the cap is screwed into place.

In the particular mandrel illustrated in Figure 1, the plug 17 has a tapered bore 19 adapted to fit over and clamp the profile strips in the grooves of the tapered nose of the mandrel body. The cap 17 also prevents rearward movement of the mandrel relative to the work blank by abutting the adjacent end of the blank.

At their other ends, the profile strips 11 are clamped to the mandrel body by a clamping device comprising a sleeve element 20 having the forward portion 21 of its bore tapered to fit over the tapered section 14 of the mandrel body and the adjacent ends of the profile strips extending along the body. The other end portion 22 of the bore in the sleeve element 20 is tapered for coaction with a conical plug 23 screwed on the tailpiece 15 of the mandrel body. By screwing the plug along the tailpiece, the sleeve element 20 is forced into clamping relation with the profile strips. The strips, of course, can be released by screwing the plug in the opposite direction.

When the mandrel has been fully inserted in the work blank, the profile strips are preferably placed under tension, thus drawing the cap 17 firmly against the forward end of the blank. While under tension, the strips are clamped to the mandrel body by screwing in the plug 23. A compression spring 24 interposed between the sleeve element 20 and a shoulder 25 formed on the adjacent end of the work blank urges the mandrel rearwardly to maintain the cap in abutting engagement with the blank, thus retaining the mandrel in proper position with respect to the blank.

When used with a cold forging machine of the type disclosed in my co-pending application above-mentioned, the work blank 8 has its end portion notched as at 26 for cooperation with the similarly notched end 27 of a chuck 28 forming a part of the machine. By reason of this notched connection, the work blank may be rotated as it is fed endwise through the forging dies 30 of the machine. The chuck shown is provided with driving teeth 31 for effecting such rotation. The chuck shown is also formed with a central bore 32 allowing the mandrel to project through it so that small amounts of elongation of the work blank 8 resulting from the forging or swaging operation can be accommodated. Connection is made with the rod through suitable clutch teeth 33 formed on the plug 23.

In its passage through the dies 30, the metal of the word blank 8 is displaced inwardly against the mandrel 5 so that its bore takes the precise dimensions and shape of the mandrel body as shown at the left end of the blank in Figure 1. After passing through the dies, the finished workpiece is disengaged from the chuck and removed from the machine. The clamping cup 17 and sleeve 20 are then removed and the profile strips 11 are freed from the anchoring plug 16 to release them for removal from the work.

Removal of the profile strips is effected while the mandrel body 6 remains in place in the workpiece. More particularly, the profile strips are drawn endwise out of the grooves formed in the workpiece and the matching grooves in the mandrel body. It will be appreciated that the profile strips must be made from material strong and tough enough to stand such treatment without appreciable dimensional changes and, moreover, they must be sufficiently flexible to follow the curves of the grooves. Material such as spring steel or piano wire seems to be satisfactory for this purpose. To facilitate withdrawal after the forging operation, the profile strips may be lubricated with suitable oil or grease when the mandrel is inserted in the work blank.

It will be apparent from the foregoing that the invention provides a mandrel of novel and advantageous construction by which hollow or tubular workpieces having indented, grooved, or other intricately shaped or irregular internal surfaces may be formed by swaging or cold forging processes. Thus, the construction of the mandrel with ribs, ridges or projections of other shapes in the form of profile elements separable from the mandrel body materially extends the field of usefulness of such processes.

I claim as my invention:

1. A mandrel comprising an elongated rigid body having a plurality of elongated longitudinally extending spiral grooves which are continuous from their forward ends to their rear ends, and whose rear ends open endwise longitudinally to a rear end of the body, and a plurality of profile elements in the form of elongated longitudinally extending flexible spiral ribs removably seated in the grooves, means for removably securing the ribs in the grooves, the opening of the grooves endwise longitudinally to the rear end of the body enabling the ribs to be twisted out spirally endwise and longitudinally from the grooves through their open ends at the rear of the body upon release of the ribs securing means.

2. A construction according to claim 1 wherein the securing means is a rib clamp at the forward end of the body.

3. A construction according to claim 1 wherein the securing means is a rib clamp at the forward end of the body, and including also a rib clamp at the rear end of the body.

4. A construction according to claim 1 wherein the pitch of the spiral is smaller at the forward end of the mandrel than at the rear end.

References Cited in the file of this patent

UNITED STATES PATENTS

| 1,017,569 | Lewis | Feb. 13, 1912 |
| 1,510,586 | Davis | Oct. 7, 1924 |
| 1,963,320 | Wright | June 19, 1934 |
| 2,312,094 | Harmon | Feb. 23, 1943 |
| 2,712,249 | Siegerist | July 5, 1955 |

FOREIGN PATENTS

| 78,565 | Switzerland | Jan. 2, 1919 |